Figures 1, 3:
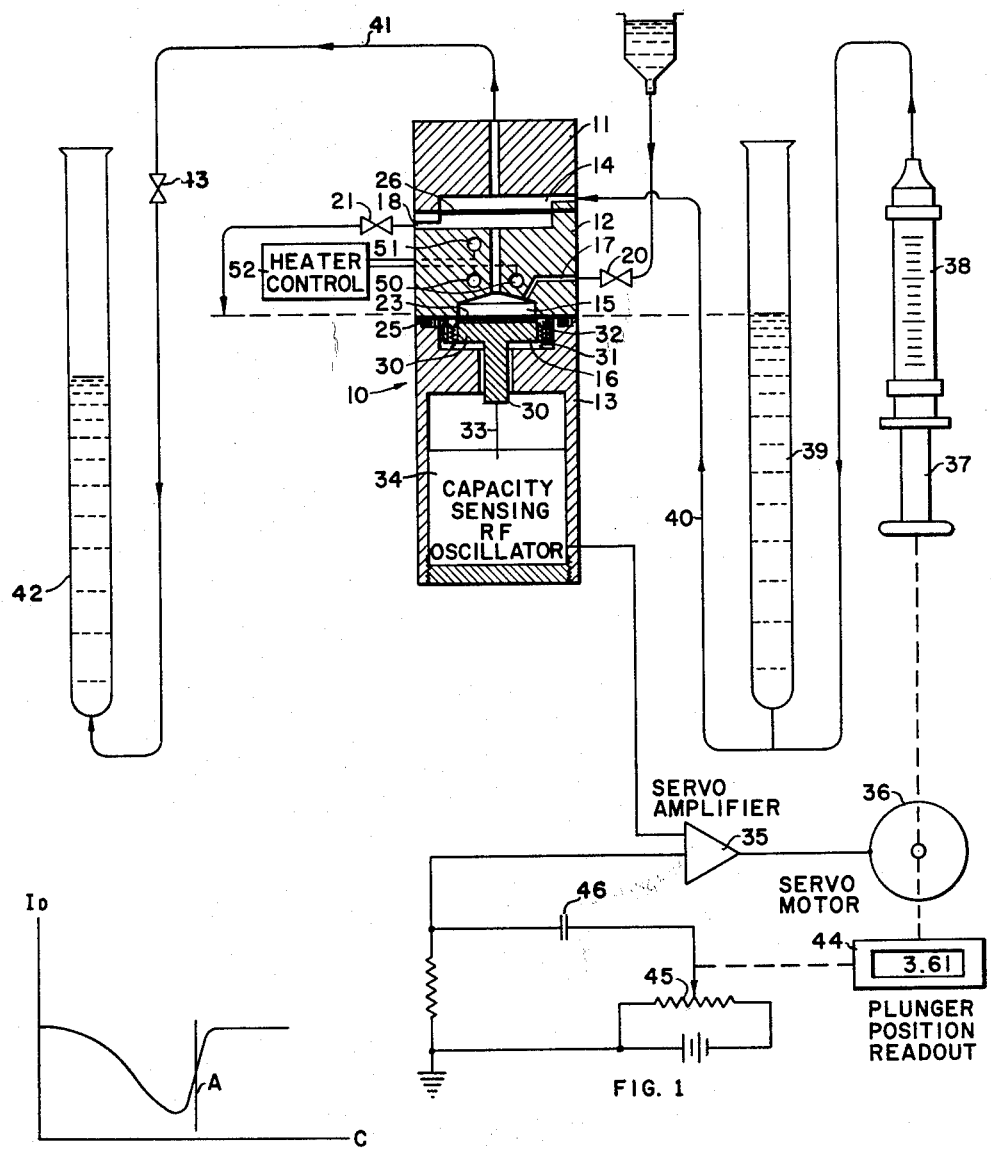

June 8, 1965  F. B. ROLFSON  3,187,562
APPARATUS FOR DETERMINING OSMOTIC PRESSURES
Filed April 10, 1962  2 Sheets-Sheet 1

INVENTOR:
FRANCIS B. ROLFSON
BY: *Theodore E. Bieber*
HIS ATTORNEY

INVENTOR:
FRANCIS B. ROLFSON
BY: *Theodore E. Bieber*
HIS ATTORNEY

United States Patent Office 3,187,562
Patented June 8, 1965

3,187,562
APPARATUS FOR DETERMINING OSMOTIC PRESSURES
Francis B. Rolfson, San Pablo, Calif., assignor to Shell Oil Company, New York, N.Y., a corporation of Delaware
Filed Apr. 10, 1962, Ser. No. 186,530
9 Claims. (Cl. 73—53)

This invention relates to automatic osmometers and more particularly to an apparatus for determining the molecular weights of polymers by osmotic pressure measurements.

At the present time average molecular weights of polymers are determined by measuring the osmotic pressure of a sample of the polymer dissolved in a suitable solvent. The present method is a laboratory procedure that requires considerable time to obtain complete results. One method for decreasing the time interval is to determine the osmotic flow for several pressures and then extrapolate these points to a zero flow condition to obtain the desired pressure value without waiting for equilibrium to occur. While this method decreases the time required for determining the osmotic pressure of a particular polymer sample, it still requires a considerable amount of time. This time is required to establish sufficient flow across a membrane to increase the pressure to a measurable amount on instruments used for measuring pressures.

Accordingly, it is a principal object of this invention to provide an apparatus for quickly and accurately determining the osmotic pressure of a solution.

A further object of this invention is to provide an instrument which determines the osmotic pressure for zero flow by balancing the pressures that occur across a membrane having a polymer solution disposed on one side thereof and the solvent for the polymer disposed on the other side thereof.

A still further object of this invention is to provide an instrument for measuring osmotic flow rates that will measure volume changes on the order of $10^{-6}$ milliliters.

The above objects and advantages of this invention are achieved by providing a sample cell having two chambers formed therein. The two chambers have a common side formed by the semi-permeable membrane through which the osmotic flow takes place. In addition one of the chambers has a side wall formed by a thin metal diaphragm that forms one plate of a capacitor type pick-up. The sample of the polymer dissolved in a solvent is injected into the chamber having side walls formed by the mebrane and diaphragm while the solvent for the polymer is injected in the other chamber. As the solvent flows through the membrane the pressure in the chamber is increased thus deflecting the diaphragm and changing the capacitance of the capacitor. This change in capacitance is used to control a crystal oscillator whose output side is coupled to a servo amplifier. The servo amplifier is used to drive a servomotor that controls the pressure of the solvent in the other chamber. Thus the system will increase or decrease the pressure of the solvent in the chamber until the capacitance is returned to its initial value. The position of the servomotor will be related to pressure of the solvent that is the same as osmotic pressure for zero osmotic flow through the diaphragm. This pressure can be measured either by measuring the position of the servomotor or utilizing the rotation of the servomotor to drive a suitable recording apparatus. Likewise, the pressure can be measured directly by means of pressure measuring devices, such as a manometer tube or the like, coupled to the solvent chamber. The instrument can be balanced and a zero position obtained by filling both chambers with solvent and equalizing the pressures in the two chambers. This will provide a zero position for the servomotor and a zero position reading on the pressure measuring device.

Figure 2:
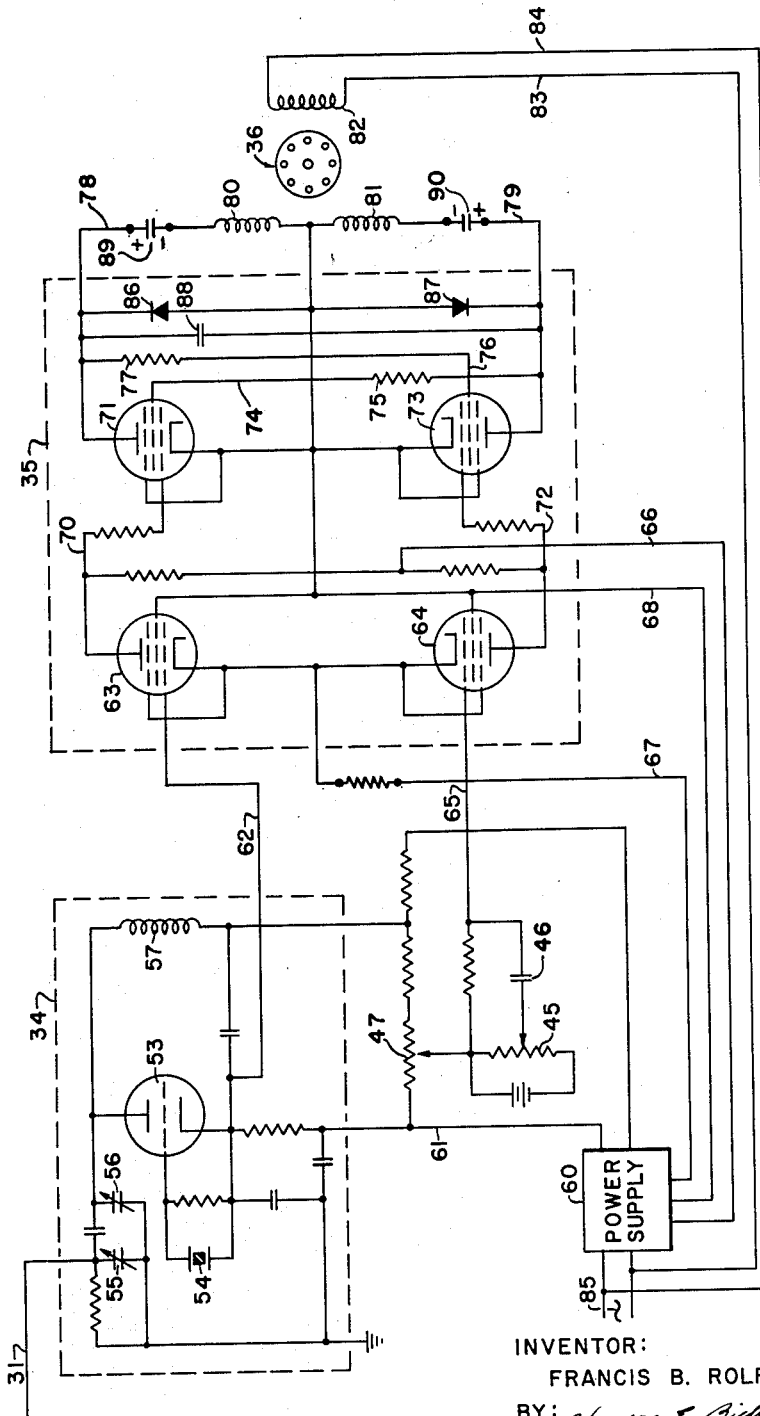

The above objects and other advantages will be more easily understood by those skilled in the art from the following description when taken in conjunction with the attached drawings, in which:

FIGURE 1 is a block diagram of the instrument with the sample cell shown in cross section;
FIGURE 2 is a schematic view of the oscillator and servo amplifier shown in FIGURE 1; and
FIGURE 3 is a curve showing the plate current of the oscillator tube with respect to the capacitance in the plate circuit.

Referring now to FIGURE 1, there is shown a sample cell 10 formed from a sandwich of three members 11, 12 and 13. The upper member 11 has a circular depression formed therein to form a chamber 14. The center section 12 is provided with an inlet passage 17 and an outlet passage 18 that communicate with a central opening that forms a chamber 15. The bottom section 13 is provided with a circular depression that forms a housing 16 for the capacitive pick-up. The sample inlet line 17 is provided with a valve 20 while the outlet line 18 from the chamber 15 is provided with a valve 21. Thus, a sample of the polymer and its solvent can be injected into the chamber 15 and isolated by closing the valves 20 and 21. The upper or solvent chamber 14 is separated from the center or solution chamber 15 by means of a membrane 26 that is clamped between the mating surfaces of the members 11 and 12. The membrane 26 may be formed from any suitable material depending on whether the solvent used for the polymer is an aqueous or non-aqueous solvent, for example if toluene is used for dissolving the polymer a suitable membrane may be formed from gel cellophane. The center or solution chamber 15 is separated from the capacitor pick-up housing 16 by a thin metallic diaphragm 23 preferably formed of a conducting material such as copper, brass or bronze. The diaphragm 23 is sealed to the lower surface of the member 12 by means of an O-ring 25 and member 13. The O-ring 25 should be of sufficient size to exert sufficient pressure on the diaphragm 23 to force it into sealing engagement with the lower surface of the member 12. The diaphragm should be flexible and relatively thin for example a .001 spring bronze diaphragm has been used with good results.

A relatively heavy metallic plate 30 is disposed adjacent the diaphragm 23 to form with diaphragm 23 the two plates of a capacitor pick-up. The plate 30 is forced into a fixed position with respect to the diaphragm 23 by means of a plurality of circumferentially spaced springs 31. The springs react against the base of spacing members 32 to force the plate 30 upwardly. The spacing members 32, which may be small sapphire jewels, are pressed into openings in the plate 30. The spacing between the diaphragm 23 and plate 30 is preferably on the order of .003 inch. The plate 30 is coupled by means of a lead 33 to a crystal controlled oscillator 34 that is tuned slightly off frequency to provide a sensitive sensing device as explained below. The crystal controlled oscillator 34 is coupled to a servo amplifier 35 that in turn is coupled to a servomotor 36. The servomotor 36 is used to position a plunger 37 within a syringe 38 to inject solvent into or withdraw solvent from the manometer 39. The manometer 39 is coupled by a tube 40 to the chamber 14 formed in the member 11. Also coupled to the chamber 14 is a tube 41 which is connected to a solvent resrvoir 42. The tube 41 is provided with a normally closed valve 43 which is only opened when it is desired to change the solvent in the chamber 14 or to vary the level of the solvent in the system. Since, therefore, the pressure in chamber 14 is proportional to the level of the solvent in the manometer tube 39 the system, by injecting or withdrawing solvent from the manometer 39, adjusts the pressure within the chamber 14 to maintain the original spacing between the capacitor plates 23 and 30.

The servomotor 36 also drives a readout device 44 which may be a mechanical counting device that is geared to the servomotor to read directly the osmotic pressure. For example, the readout device 44, through suitable gearing, can be set to indicate, e.g. in cm., the change in the position of plunger 37 from the zero or balanced position. Since the position of the plunger 37 is proportional to the level of solvent in the manometer tube 39 and hence the pressure in the chamber 14, the amount of movement of the plunger from the zero to the equilibrium position is a direct indication of the osmotic pressure. Likewise, the servomotor can be used to drive a potentiometer whose signal is recorded on a chart recorder or the like. In addition to the read-out device 44, the solvent in the height of the manometer tube 39 may be used to provide a visual indication of the pressure within the chamber 14.

Servomotor 36 may also be used to position a potentiometer 45 to generate a negative feedback signal for the servo amplifier 35 to assist in returning the amplifier to a null condition in the event there is instability in the servo system, for example, as caused by a relatively inflexible permeable membrane. In the illustrated embodiment, the output voltage from the potentiometer 45 is proportional to the rate of change of position of the movable center tap of potentiometer 45 since it is fed to the amplifier 35 through a capacitor 46, and hence produces no feedback signal when the system is in a nulled or balanced condition.

In order to insure uniform temperatures within the sample cell two heating elements 50 are disposed within cavities formed in the member 12. The power supplied to heating element 50 is controlled by controller 52 that utilizes the temperature sensed by a resistance thermometer 51. This type of thermo regulating system is more particularly described and claimed in U.S. Patent No. 2,838,644.

From the above description it may be seen that this invention provides a sample cell having two individual chambers. The upper or solvent chamber is isolated from the central or solution chamber by means of a semi-permeable membrane while the capacitor housing is separated from the central chamber by means of a flexible diaphragm. The sample of polymer dissolved in a suitable solvent is introduced into the central chamber and isolated therein. A solvent is then introduced into the upper chamber and allowed to pass through the membrane due to the difference between the pressure existing in the upper chamber and the osmotic pressure of the sample solution. This will increase the pressure in the central chamber causing the thin flexible metal diaphragm to deform or move closer to the plate 30. This movement will change the capacitance of the capacitor pick-up formed by the diaphragm and the plate 30, thus causing the oscillator to generate a signal. This signal will be used to position a servomotor that will move the plunger 37 downwardly to reduce the pressure in the chamber 15. After a relatively short time, on the order of 3 to 5 minutes, an equilibrium will be reached and no further flow of the solvent through the membrane 26 will occur. The pressure existing in the chamber 15 at the equilibrium position will then be a measure of the osmotic pressure of the solution. It should be noted that the capacitor plate 30 is a relatively massive plate that is spring biased to a fixed position with relation to the diaphragm 23. In addition, to insure that the system has a fixed capacitance in the absence of movement of the diaphragm it is preferable to mount the oscillator directly on the sample cell 10 as by a continuation of the member 13.

Referring now to FIGURE 2, there is shown a schematic diagram of the crystal controlled oscillator 34 and the servo amplifier 35 described above. The crystal controlled oscillator utilizes a triode 53 having a crystal 54 connected in its grid circuit. Two variable capacitors 55 and 56 are disposed in the plate circuit of the triode 53 to adjust the frequency of the oscillator with the oscillator signal appearing across the inductance 57. The oscillator is connected to a power supply 60 by means of lead 61. The power supply 60 is designed to furnish the various voltages required in the different portions of the oscillator and amplifier circuits.

The above-described oscillator 34 is a free-running crystal controlled oscillator that will have a fixed frequency depending upon the crystal 54 and the values of the various components of the circuit. These components are selected and the capacitors 55 and 56 adjusted so that the oscillator normally oscillates at a frequency slightly lower than the resonant frequency for the circuit. This can be readily seen in FIGURE 3 where the plate current is plotted along the abscissa and the plate capacitance is plotted along the ordinate. As shown in FIGURE 3, as the capacitance in the plate circuit increases the plate current gradually decreases until it reaches the resonant frequency. A further increase in the plate capacitance causes a rapid rise in the plate current. Thus, if the capacitance in the plate circuit of the oscillator 34 is adjusted so that the oscillator oscillates at the point A in FIGURE 3 any decrease in the capacitance will cause a rapid decrease in the plate current of the oscillator. This provides a very sensitive means for measuring the flow of solvent from the solvent chamber 14 into the solution chamber 15 of the sample cell.

The oscillator is coupled by means of a lead 62 to a pentode tube 63 that in turn is coupled to second pentode 71 by means of a lead 70. The two pentodes 63 and 71 form two stages of one-half of a balanced direct current amplifier, the other half being formed by the pentodes 64 and 73 which are coupled together by means of lead 72. Coupled to the input of pentode 64 by means of a lead 65 is the movable contact of a voltage divider 47 which is connected across one of the pairs of output terminals of the power supply 60. The movable contact of the voltage divider 47 is initially positioned so that the voltage at the movable contact is the same as the voltage on the line 62 when the system is at rest, i.e., the voltage corresponding to point A, FIGURE 3. The reset potentiometer 45 is also coupled to the pentode 64 by means of the lead 65. The power supply 60 is coupled by means of leads 66, 67 and 68 to the various elements of the two pentodes 63 and 64. The pentode 71 is coupled to one control winding 80 of the servomotor 36 by a lead 78 while the pentode 73 is coupled to the other control winding 81 of the servomotor by a lead 79. The servomotor 36 is preferably of the shaded pole type that is controlled by a decrease in the impedance of one of the shading coil windings 80 or 81. Thus, the direction of rotation of the servomotor 36 will be controlled by the conduction of the tubes 71 and 73. The field winding 82 for the servomotor is coupled to an alternating current power supply 85 by means of leads 83 and 84. To increase the gain of the servo amplifier, the screen grid of the pentode 71 is coupled by means of a lead 74 through a resistance 75 to the plate of the pentode 73. Similarly, the screen grid of the pentode 73 is coupled by a lead 76 and a resistance 77 to the plate of the pentode 71. These two connections provide a path for the screen grid current of each tube to the plate of its mating tube and thus constitute a positive feedback that increases the gain of this stage by approximately ten. A capacitor 88 is coupled between the plates of the pentodes 71 and 73 to prevent parasitic oscillations which would otherwise result from the positive feedback.

To improve the operation of the servomotor, diodes 86 and 87 and respective capacitors 89 and 90 are disposed in the plate circuits of the two pentodes 71 and 73, respectively. The use of the diodes and capacitors provide full wave conduction through the two shading coils 80 and 81, thus increasing the motor torque of the servomotor 36. For example, if one of the tubes is biased to cut off the diode associated with this tube will quickly charge its respective capacitor to the polarity shown which will be the peak voltage of the shading coil associated with the tube and no further conduction will occur. When the tube begins to conduct on the next half cycle of the supply voltage, the capacitor will discharge through the plate circuit of the tube; thereby causing the capacitor to draw current through the diode on the next half cycle of the supply voltage when the tube is non-conducting. Thus, there will be full wave conduction through the shading coils 80 and 81 that results in an increased torque for the servomotor 36.

The operation of the above system can best be understood by referring to FIGURES 1 and 2. The zero position of the instrument can be determined as explained above by introducing solvent into both the solvent chamber 14 and the solution chamber 15. The oscillator 33, servo amplifier 34 and servomotor 35 can then be energized from the power supply and the instrument permitted to operate until it reaches an equilibrium position. The solvent can then be flushed from the solution chamber 15 and the sample of the polymer dissolved in the solvent introduced and isolated therein by closing the valves 20 and 21. The solvent from the chamber 14 will then pass through the permeable membrane 26 in the solution chamber 15. This will increase the pressure in the chamber 15 and deflect the diaphragm 23. The deflection of the diaphragm 23 will cause a decrease in the capacitance of the capacitor pick-up formed by the diaphragm 23 and the plate 30. This decrease in the capacitance will also decrease the capacitance in the plate circuit of the oscillator 34 causing a rapid fall in the plate current of the oscillator. This will cause the servo amplifier 35 to operate and the tube 71 therein to conduct; thus energizing the shading coil 80 to operate the servomotor 36. The servomotor 36 will rotate in a direction to withdraw the plunger 37 from the syringe 38. This will decrease the pressure of the solvent in the chamber 14 thus reducing the flow of solvent through the permeable member 26. This operation will continue until an equilibrium is reached in which no further solvent flow through the membrane 26 takes place. When equilibrium is reached the pressure within the chamber 14 will be equal to the osmotic pressure of the sample and this pressure will, of course, be related to the position of the plunger 37 within the syringe 38. The plunger position, and thereby the change in pressure which is the osmotic pressure of this solution can be determined from the readout device 44 or as explained above, the rotation of the servomotor 36 can be used to drive a potentiometer whose output signal is coupled to a chart recording device.

It should be noted that if at any time the pressure in the chamber 15 is less than the pressure in chamber 14, the tube 71 will be nonconducting but the tube 73 will then begin to conduct; thereby energizing the shading coil 81 and causing the servomotor to operate in the reverse direction to increase the pressure in the chamber 15 until equilibrium is obtained.

The above-described device can be used to control a polymerization process by timing the flow of a sample of the polymer dissolved in a suitable solvent through the sample cell 10. The servomotor position 36 can then be used as a control signal for the control system that controls the polymerization process.

While the osmometer of this invention has been described with relation to the measurement of osmotic pressures of polymers, it obviously can be used to measure the osmotic pressure of any material. The material used for forming the membrane must be chosen with relation to the solvent used for the material. Except for the membrane material, no other changes need be made in the osmometer to determine the osmotic pressure of various materials. Of course, one particular membrane, as for example gel cellophane, can be used with a large number of different materials.

I claim as my invention:

1. An instrument for determining osmotic pressure comprising:
    a cell member having a chamber formed therein for holding a solution sample of the material whose osmotic pressure is desired, one wall of said chamber being formed by a permeable membrane and a second wall being formed by a flexible metal diaphragm;
    a second chamber formed in said cell and having one wall formed by said permeable membrane, said second chamber containing the solvent in which said material is dissolved;
    a capacitance plate disposed on the outside of said first chamber adjacent said flexible metal diaphragm, said capacitance plate and said flexible metal diaphragm forming a capacitor;
    an oscillator circuit, said capacitor being coupled in the plate circuit of said oscillator to control the oscillations thereof;
    a servo system, said servo system being coupled to a means to adjust the pressure in said second chamber;
    said oscillator being coupled to said servo system to control the operation thereof in response to the deflection of said flexible diaphragm to balance the pressure on both sides of said membrane; and
    means coupled to said servo system for producing an indication proportional to the change in pressure necessary to balance the pressure on both sides of said membrane as an indication of the osmotic pressure of the material.

2. An instrument for determining osmotic pressure comprising:
    a cell member having a chamber formed therein for holding a solution sample of the material whose osmotic pressure is desired, one wall of said chamber being formed by a permeable membrane and a second wall being formed by a flexible metal diaphragm;
    a second chamber formed in said cell and having one wall formed by said permeable membrane, said second chamber containing the solvent in which said material is dissolved;
    a capacitance plate disposed on the outside of said first chamber adjacent said flexible metal diaphragm, said capacitance plate and flexible metal diaphragm forming a capacitor;
    an oscillator circuit, said capacitor plate being coupled in the plate circuit of said oscillator to control the oscillations thereof;
    a servo amplifier, said oscillator being coupled to said servo amplifier;
    a pressure control system disposed to adjust the pressure in said second chamber;
    a servomotor, said servomotor being coupled to said servo amplifier and disposed to operate said pressure control system whereby the pressure in said second chamber may be equalized with the pressure in said first chamber; and
    means coupled to said servomotor for producing an indication proportional to the change in pressure necessary to equalize the pressures in said first and second chambers as a measure of the osmotic pressure of said material.

3. An instrument for determining osmotic pressure comprising:
    a cell member having a chamber for holding a solution sample of the material whose osmotic pressure is desired, one wall of said chamber being formed by a permeable membrane and a second wall being formed by a flexible metal diaphragm;
    a second chamber formed in said cell and having one wall formed by said permeable membrane, said second chamber containing the solvent in which said material is dissolved;

a capacitance plate disposed on the outside of said first chamber adjacent said flexible metal diaphragm, said capacitance plate and flexible metal diaphragm forming a capacitor;

a crystal control oscillator, said oscillator being mounted on a frame rigidly attached to said cell and said capacitor being disposed in the plate circuit of said oscillator to control the flow of plate current therein, said oscillator in addition being coupled to a servo amplifier;

a pressure control means coupled to said second chamber to adjust the pressure therein;

a servomotor disposed to drive said pressure control means, said servomotor being coupled to said servo amplifier, said servo amplifier being responsive to the signals from said oscillator to drive said servomotor in a direction to cause the pressure within the said first and second chambers to be equalized; and, means coupled to said servomotor for producing an indication of the change in pressure in said second chamber as an indication of the osmotic pressure of the material.

4. An instrument for determining osmotic pressure comprising:

a cell member having a chamber formed therein for holding a solution sample of the material whose osmotic pressure is desired, one wall of said chamber being formed by a permeable membrane and a second wall being formed by a flexible metal diaphragm;

a second chamber formed in said cell and having one wall formed by said permeable membrane, said second chamber containing the solvent in which said material is dissolved;

a capacitance plate disposed on the outside of said first chamber adjacent said flexible metal diaphragm, said capacitance plate being biased to a fixed position relative to said flexible metal diaphragm, said capacitance plate and flexible metal diaphragm forming a capacitor;

a crystal controlled oscillator, said oscillator being mounted on a frame rigidly attached to said cell and said capacitor being disposed in the plate circuit of said oscillator to control the flow of plate current;

said oscillator being coupled to a servo amplifier;

a pressure control means coupled to said second chamber to adjust the pressure in said second chamber;

a servomotor coupled to the output of said servo amplifier, said servo meter being disposed to drive said pressure control means in response to signals from said servo amplifier to equalize the pressures within said first and second chambers; and means coupled to said servomotor for producing an indication proportional to the change in pressure necessary to equalize the pressures within said first and second chambers as a measure of the osmotic pressure of the material.

5. An instrument for determining osmotic pressures comprising:

a cell member having a first chamber formed therein to contain a sample of the material whose osmotic pressure is desired and a second chamber for containing a solvent for the material, said first and second chambers having a common wall formed by a permeable membrane;

pressure sensing means disposed to sense the pressure in said first chamber;

a pressure control means, said pressure control means being disposed to adjust the pressure in said second chamber, said pressure control means being coupled to said pressure sensing means to equalize the pressures in said first and second chambers;

and recording means coupled to the pressure control means to record the position thereof as an indication of the osmotic pressure of the material.

6. The apparatus of claim 5 including heating means for maintaining a uniform temperature within said cell.

7. An instrument for determining osmotic pressure comprising:

a cell member having a first chamber therein, one wall of said chamber being formed by a permeable membrane and a second wall being formed by a flexible metal diaphragm;

a second chamber formed in said cell and having one wall formed by said permeable membrane, one of said chambers containing a solution sample of the material whose osmotic pressure is desired and the other of said chambers containing the solvent in which said material is dissolved;

a capacitance plate disposed on the ouside of said first chamber adjacent said flexible metal diaphragm, said capacitance plate and said flexible metal diaphragm forming a capacitor;

an oscillator circuit, said capacitor being coupled in the plate circuit of said oscillator to control the oscillations thereof;

a servo system, said servo system being coupled to a means to adjust the pressure in the one of said chambers containing the solvent;

said oscillator being coupled to said servo system to control the operation thereof in response to the deflection of said flexible diaphragm to balance the pressure on both sides of said permeable membrane; and means coupled to said servo system for producing an indication proportional to the change in pressure necessary to balance the pressure on both sides of said membrane as a measure of the osmotic pressure of said material.

8. An instrument for determining osmotic pressures comprising:

a cell member having a first and a second chamber formed therein, said first and second chambers having a common wall formed by a permeable membrane, one of said chambers containing a sample of the material whose osmotic pressure is desired and the other of said chambers containing a solvent for the material;

pressure-sensing means disposed to sense the pressure in said first chamber;

a pressure-control means, said pressure control means being disposed to adjust the pressure in the one of said chambers containing the solvent, said pressure control means being coupled to said pressure-sensing means and responsive to signals therefrom to equalize the pressures in said first and second chambers; and, recording means coupled to the pressure control means to record the position thereof as an indication of the osmotic pressure of the material.

9. The apparatus of claim 8 wherein said pressure-sensing means comprises:

a flexible metal diaphragm forming a second wall of said first chamber;

a capacitance plate adjacent said metal diaphragm on the outside of said chamber, said capacitor plate and said metal diaphragm forming a capacitor; and an oscillator circuit having its output connected to the input of said pressure control means, said capacitor being coupled to said oscillator to control the oscillations thereof.

References Cited by the Examiner
UNITED STATES PATENTS 3,063,288   11/62   Reiff _____ 73—53

RICHARD C. QUEISSER, *Primary Examiner.*